United States Patent
Zhang et al.

(10) Patent No.: US 8,354,875 B2
(45) Date of Patent: Jan. 15, 2013

(54) LOW VOLTAGE TEMPERATURE SENSOR AND USE THEREOF FOR AUTONOMOUS MULTIPROBE MEASUREMENT DEVICE

(75) Inventors: Junmou Zhang, San Diego, CA (US); Lew G. Chua-Eoan, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 12/731,455

(22) Filed: Mar. 25, 2010

(65) Prior Publication Data

US 2011/0234300 A1    Sep. 29, 2011

(51) Int. Cl.
*H01L 35/00* (2006.01)

(52) U.S. Cl. .................................................. 327/512

(58) Field of Classification Search .......... 327/512, 327/564, 565
See application file for complete search history.

(56) References Cited

U.S. PATENT DOCUMENTS

| | | | |
|---|---|---|---|
| 6,169,442 B1 * | 1/2001 | Meehan et al. | 327/513 |
| 6,836,160 B2 | 12/2004 | Li | |
| 6,850,125 B2 * | 2/2005 | Norman et al. | 331/65 |
| 6,922,164 B1 * | 7/2005 | Piasecki et al. | 341/163 |
| 7,149,645 B2 * | 12/2006 | Mangrulkar et al. | 702/130 |
| 7,309,998 B2 * | 12/2007 | Burns et al. | 324/762.01 |
| 7,461,972 B2 | 12/2008 | Cohen | |
| 2008/0018319 A1 | 1/2008 | Chang et al. | |
| 2008/0042737 A1 | 2/2008 | Kim et al. | |
| 2008/0088361 A1 | 4/2008 | Kimura | |
| 2009/0121699 A1 | 5/2009 | Park et al. | |

FOREIGN PATENT DOCUMENTS

WO    WO2005111640 A1    11/2005

OTHER PUBLICATIONS

International Search Report and Written Opinion—PCT/US2011/029965—ISA/EPO—May 4, 2012.

\* cited by examiner

*Primary Examiner* — Jeffrey Zweizig
(74) *Attorney, Agent, or Firm* — Sam Talpalatsky; Nicholas J. Pauley; Jonathan T. Velasco

(57) ABSTRACT

A bandgap sensor which measures temperatures within an integrated circuit is presented. The sensor may include a first transistor having an emitter node coupled in series to a first resistor and a first current source, wherein a PTAT current flows through the first resistor, and a second transistor having a base node coupled to a base node of the first transistor, and a collector node coupled to a collector node of the first transistor, further wherein the first and second transistors are diode connected. The sensor may further include a first operational amplifier providing negative feedback to the first current source, wherein the negative feedback is related to a difference in the base-emitter voltages of the first and second transistors, and a second operational amplifier which couples the base-emitter voltage of the second transistor across a second resistor, wherein a CTAT current flows through the second resistor.

13 Claims, 5 Drawing Sheets

LOW VOLTAGE TEMPERATURE SENSOR AND USE THEREOF FOR AUTONOMOUS MULTIPROBE MEASUREMENT DEVICE

FIELD OF DISCLOSURE

Disclosed embodiments are related to low voltage temperature sensors and their use within measurement devices. More particularly, the embodiments are related to power efficient devices that can measure temperature at one or more locations within an integrated circuit in an autonomous manner.

BACKGROUND

With the increasing capabilities of modern mobile devices and their corresponding increase in usage, temperature considerations of such devices across various modes of operation can become increasingly important. For example, temperature variations across one or more dies within integrated circuits used in mobile devices may be an important design parameter for various functional components, including Application Specific Integrated Circuit (ASICs), Systems on a Chip (SoCs), Microprocessors, Digital Signal Processors (DSPs), Application Specific Processors (ASPs), Field Programmable Gate Arrays, (FPGAs), memories, etc.

In particular, the start-up and shutdown of various devices and different voltage domains, and the onset of "temperature inversion" in deep submicron devices, has highlighted the desirability for temperature tracking which can be voltage and process independent. Additional information regarding how temperature varies (i.e., temperature gradients) across one or more dies within an integrated circuit can be useful in monitoring performance and power consumption.

Given the ever-present desirability to extend battery life, the tight power constraints of mobile devices can drive the motivation for temperature monitoring approaches which consume less power directly, while also reducing resource consumption (e.g., processor cycles) on other subsystems.

SUMMARY

Exemplary embodiments are directed to low voltage temperature sensors and their use in autonomous multiprobe measurement devices. Embodiments presented herein may have the advantage of reduced power dissipation: both directly by using more efficient temperature sensors, and/or indirectly through autonomous device operation which can reduce resource consumption of other processing subsystems. Moreover, embodiments may reduce the footprint of measurement devices and also operate in multi-voltage and/or multi-clocking domains.

In one embodiment, a bandgap sensor which measures temperatures within an integrated circuit is described. The bandgap sensor may include a first transistor having an emitter node coupled in series to a first resistor and a first current source, wherein a PTAT (proportional to absolute temperature) current flows through the first resistor, and a second transistor having a base node coupled to a base node of the first transistor, and a collector node coupled to a collector node of the first transistor, further wherein the first and second transistors are diode connected. The bandgap sensor may further include a first operational amplifier providing negative feedback to the first current source, wherein the negative feedback is related to a difference in the base-emitter voltages of the first and second transistors, and a second operational amplifier which couples the base-emitter voltage of the second transistor across a second resistor, wherein a CTAT (complementary to absolute temperature) current flows through the second resistor.

In another embodiment, a device for providing temperature measurements within a package housing at least one integrated circuit is described. The device may include a plurality of bandgap sensors which provide currents proportional to their surrounding temperature, and a multiplexer coupled to each bandgap sensor which accepts a control signal for selecting a current to sample. The device may further include a digital-to-analog converter coupled to the multiplexer which digitizes the selected current, and an oscillator which provides a sampling clock signal to the analog-to-digital converter.

In another embodiment, a method for measuring temperatures using at least one bandgap sensor is described. The method may include receiving a measurement interval and/or at least one temperature limit, and measuring at least one temperature using the at least one bandgap temperature sensor. The method may further include determining that the measured temperature is within a temperature limit, and determining when to perform another temperature measurement.

BRIEF DESCRIPTION OF THE DRAWINGS

The accompanying drawings are presented to aid in the description of embodiments are provided solely for illustration of the embodiments and not limitation thereof.

DETAILED DESCRIPTION

Figure 1:
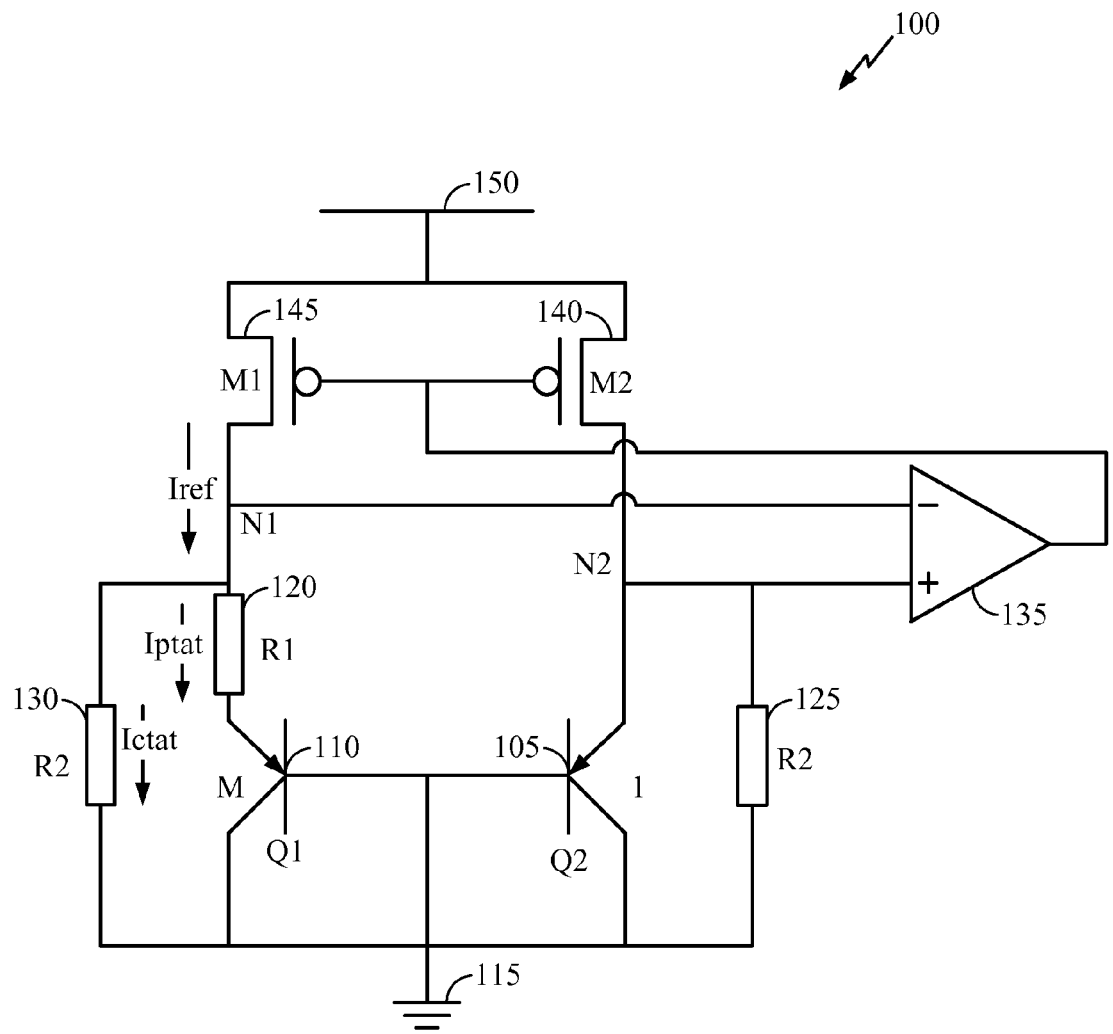
FIG. 1 is a schematic diagram of a conventional bandgap temperature sensor.

Aspects of the embodiments are disclosed in the following description and related drawings directed to such embodiments. Alternate embodiments may be devised without departing from the scope of the invention. Additionally, well-known elements used an applied in embodiments will not be described in detail or will be omitted so as not to obscure relevant details.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein is for the purpose of describing particular embodiments only and is not intended to be limiting of the various embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

As used herein, the term "mobile device" may refer to any type of wireless communication device which may transfer information over a network. The mobile device may be any cellular mobile terminal, personal communication system (PCS) device, portable data units such as personal navigation devices, GPS enabled devices, laptops, set-top boxes, music players, video players, personal digital assistant, fixed location data units such as meter reading equipment, or any other suitable device that stores or retrieves data or computer instructions or any combination thereof. The mobile device may be capable of receiving and processing network and/or Satellite Position System signals. Moreover, as used herein, the term "network" may refer to any wireless communication network, including a wireless wide area network (WWAN), a wireless local area network (WLAN), a wireless personal area network (WPAN), and so on. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more Radio Access Technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be used for any combination of WWAN, WLAN and/or WPAN. Although the Figures below illustrate remote units according to the teachings of the disclosure, the disclosure is not limited to these exemplary illustrated units. Embodiments of the disclosure may be suitable employed in any device which includes active integrated circuitry include memory and on-chip circuitry for test and characterization.

The foregoing disclosed devices and methods are typically designed and configured into GDSII and GERBER computer files, stored on a computer readable media. These files re in turn provided to fabrication handlers who fabricate device based on these files. The resulting produces are semiconductor wavers that are then cut into semiconductor die and packaged into a semiconductor chip. The chips may then be employed in devices described herein.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

FIG. 1 is a schematic diagram of a conventional bandgap temperature sensor 100. Bandgap temperature sensor 100 may include a first bipolar junction transistor 110 and a second bipolar junction transistor 105, both of which have their base and collector nodes connected (i.e., short-circuited). This configuration is said to be "diode connected," as only one base-emitter p-n junction is active (i.e., conducts current) in each transistor, and the other p-n junction (corresponding to the collector-base) may be shorted out. Both transistors 110 and 105 may have their base and collector nodes connected to ground, so that their respective collector-base voltages are zero. As a result, the voltage drop across the transistors 105 and 110 correspond to their respective base-emitter voltages. A resistor 120 having a resistance value of R1 may be connected in series to the emitter node of transistor 110, and another resistor 130, having a resistance value of R2, may be connected in parallel with series connection of the resistor 120 and the transistor 110. Another resistor 125, which also may have a resistance value of R2, may be connected at the emitter and collector nodes of transistor 105.

An operational amplifier may have an inverting input connected to the high potential side of resistor 120 (shown as node "N1"), and have its non-inverting input connected to the node shared by both the resistor 125 and the emitter of transistor 105 (shown as node "N2"). The output of the operational amplifier 135 may be connected to a current source, which may include transistors 140, 145 and a voltage source 150, configured as shown in FIG. 1. The output of the operational amplifier may control the transistors 140, 145 in the current source, so that the voltages at nodes N1 and N2 are forced to the same voltage.

The bandgap circuit 100 may rely upon the two bipolar junction transistors 105, 110 (or depending upon the implementation, two groups of transistors) which may operate at different emitter current densities. As shown in FIG. 1, transistor 110 may be designated as having a current density "m," and the other transistor 105 may be normalized at a current density of 1. The ratio m:1 may typically lie within the range of 2-128, inclusively but can be any practical value. This ratio can cause a difference in the base-emitter voltage between transistor 110 and transistor 105. This difference in voltage may be amplified by the operational amplifier 135 by a factor approximately corresponding to "m," and then combined to the base-emitter voltage. The total of these voltages may sum to a voltage approximately in the range of 0.3-1.0 volts.

One characteristic of the conventional bandgap temperature sensor 100 is that the current (Iptat) flowing serially through resistor 120 and the base-emitter junction of transistor 110 is a current which is linearly proportional to absolute temperature (PTAT), and this value may be used to measure temperature. This relationship may be modeled by the equation:

$$I\text{ptat}=kT/q*\ln(m)/R1;$$

where:
k is Boltzman's constant,
T is the temperature in degrees Kelvin,
q is the electron charge,
m is the ratio of current densities as defined above, and
R1 is the resistance value of resistor 120.

However, one aspect of the conventional bandgap temperature sensor 100 is that the PTAT current Iptat is difficult to isolate from the current (Ictat) flowing through resistor 130, thus it may be difficult to extract temperature information from the circuit shown in FIG. 1.

Figure 2:
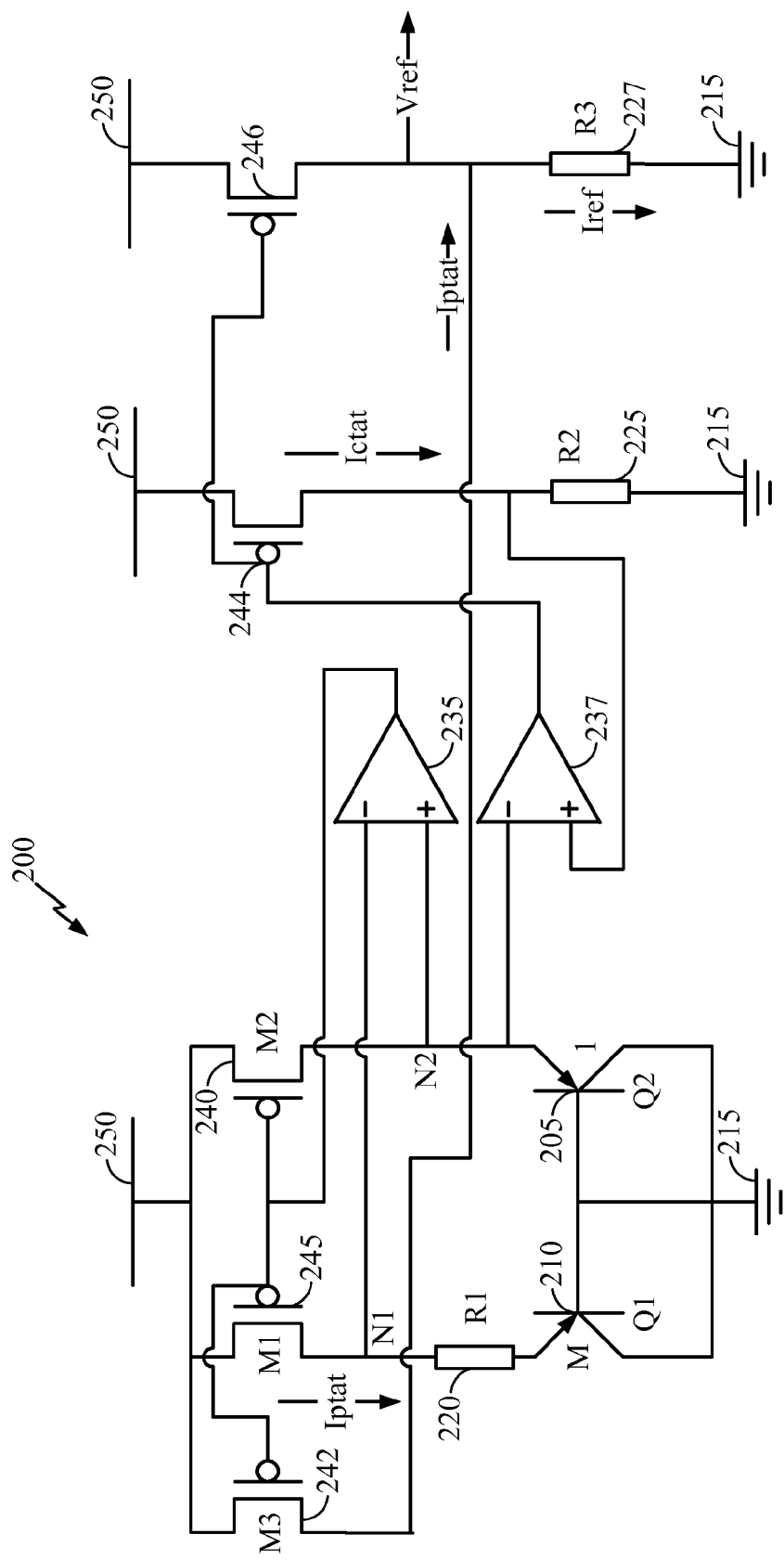
FIG. 2 is a schematic diagram of an exemplary low voltage bandgap temperature sensor.

FIG. 2 is a schematic diagram of an exemplary low voltage bandgap temperature sensor 200. Bandgap temperature sensor 200 may include a first bipolar junction transistor 210 and a second bipolar junction transistor 205, both of which may be diode connected, and the base and collector nodes of these transistors may be coupled to ground 215. First and second bipolar junction transistors 210, 205 may be vertical bipolar transistors which can be realized using conventional CMOS fabrication technology. Vertical bipolar transistors may be carefully designed in the foundry and subject to less process variation than other types of semiconductor devices (e.g., diodes and/or lateral bipolar transistors). A resistor 220 having a resistance value of R1 may be connected in series to the emitter node of transistor 210. A first operational amplifier 235 may have an inverting input connected to the high potential side of resistor 220 (shown as node "N1"), and have its non-inverting input connected to the emitter node of transistor 205 (shown as node "N2"). The output of the operational amplifier 235 may be connected to a first current source, which may include transistors 240, 242, 245 and a voltage source 250, configured as shown in FIG. 1. The output of the first operational amplifier 235 may control the transistors 240, 242, 245 in the first current source, so that the voltages at nodes N1 and N2 may be driven to the same voltage. A second operational amplifier 237 may have its inverting input connected to the emitter node of transistor 205, and have its non-inverting input coupled to the higher potential node of resistor 225. The resistor 225 may have also a resistance value of R2. The output of the second operational amplifier 237 may be used to control a second current source which includes transistors 244, 246 and power supply voltage 250. The function of the second operational amplifier is to couple the base-emitter voltage of transistor 205 over to resistor 225. This allows the Ictat current, which flows through resistor 225, to be separated from the Iptat current, which flows through resistor 220. The sum of Iptat and Ictat is the reference current Iref, which may be substantially invariant with respect to absolute temperature. As shown in FIG. 2, Iref flows through resistor 227, which may have a resistance value of R3.

Regarding the first current source in more detail, source nodes of transistors 240, 242, 245 may be connected to voltage supply 250, and the gate nodes of these transistors 240, 242, 245 may be connected to the first operational amplifier 235. The drain node of transistor 242, which has the Iptat current flowing there through, may be connected to the higher potential node of resistor 227. The drain node of transistor 245 may be connected to the node of resistor 220 having the higher voltage, which also has the Iptat current running there through. Finally, the drain node of transistor 240 may be connected to the emitter node of transistor 205.

Regarding the second current source in more detail, source nodes of transistors 244, 246 may be connected to voltage supply 250, and the gate nodes of these transistors 244, 246 may be connected to the second operational amplifier 237. The drain node of transistor 244, which has the Ictat current flowing there through, may be connected to the higher potential node of resistor 225. The drain node of transistor 246 may be connected to the node of resistor 227 having the higher voltage, which has the Iref current running there through.

The bandgap circuit 200 may rely upon the two bipolar junction transistors 205, 210 (or depending upon the implementation, two groups of transistors) which may operate at different emitter current densities. As shown in FIG. 2, transistor 210 may be designated as having a current density "m," and the other transistor 205 may be normalized at a current density of 1. In one embodiment, the ratio m:1 may be approximately 4, but in general may take on any practical value. For example, a range of the m:1 ratio may be 2-128. This ratio can cause a difference in the base-emitter voltage between transistor 210 and transistor 205. The addition of the second operational amplifier 237, which operates as a voltage buffer, and further serves to couple the base-emitter voltage of transistor 205 to resistor 225, which allows for the separation of the Iptat and Ictat currents. The Iptat current may be modeled using the same equation $Iptat=kT/q*\ln(m)/R1$ as provided above in the description of FIG. 1.

The m:1 difference in current density between transistors 205, 210 may be obtained by lumping (i.e., connecting in parallel) a plurality of transistors for transistor 210, or this ratio may be obtained using a single transistor 210 having an emitter area which is m times the emitter area of transistor 205, which may be done during the fabrication process.

The bandgap temperature sensor 200 may provide the advantage of using a lower supply voltage that the conventional sensor 100 which can result in lower power consumption. Also, bandgap temperature sensor 200 is less sensitive to process variations and sizes (e.g., 45 nm vs. 65 nm) than the conventional bandgap sensor 100.

While the embodiment shown in FIG. 2 depicts transistors 240, 242, 244-246 as field effect transistors, other types of transistors may be used to realize a current mirror, such as, for example, bipolar transistors, VMOS based transistor for special processes, etc.

Figure 3:
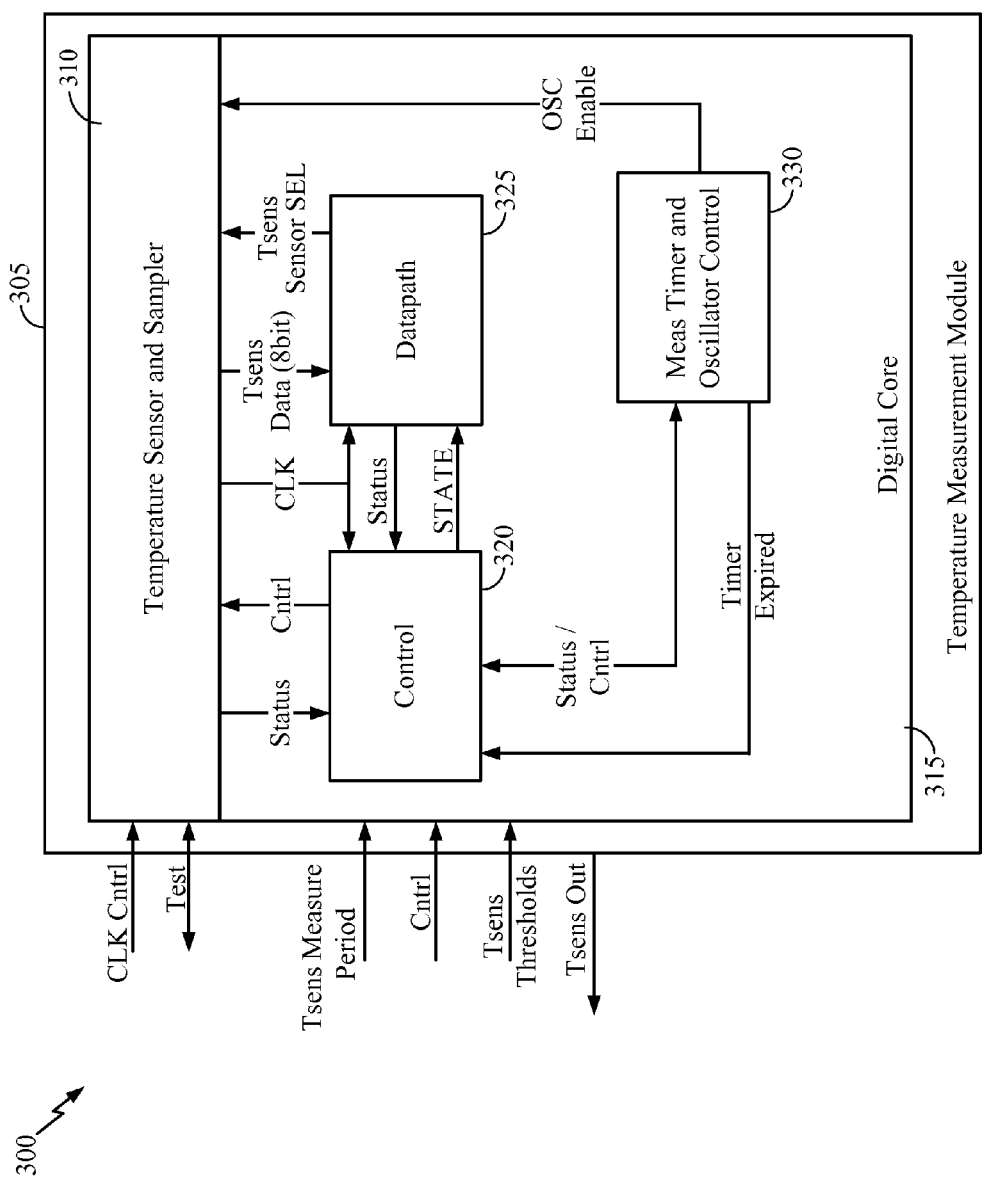
FIG. 3 is a block diagram of an exemplary multiprobe temperature measurement device using a plurality of low voltage bandgap temperature sensors.

FIG. 3 is a block diagram of an exemplary multiprobe temperature measurement device 300 using a plurality of low voltage bandgap temperature sensors 200. The multiprobe measurement device 300 may be used within a mobile device, and include temperature measurement module 305, a digital core 315, and a temperature sensor and sampler module 310. The temperature sensor and sampler module 310 may include a plurality of bandgap temperature sensors, such as those described above in FIG. 2, and an internal oscillator. This module may accept an external clock control input (CLK Cntrl) and accept/provide a number of test and status signals for testing. Details of an exemplary temperature sensor and sampler module 310 are provided below in the description of FIG. 4.

The digital core 315 may include a control module 320, a datapath module 325, and a measurement timer and oscillator control module 330. The control module 320 may be a finite state machine, and provide control signals and receive status messages to/from the other modules within the multiprobe temperature measurement device 300. Additionally, the control module 320 provides a message (STATE) indicating the overall state of the device 300 to the datapath module 325. The datapath module may provide a signal (Tsens Sensor SEL) to the temperature sensor and sampler module 310 to select a measurement from one of the plurality of temperature sensors. As a result, the datapath module 325 may receive temperature sensor data (Tsens Data) from the selected sensor within the temperature sensor and sampler module 310. This temperature data may be provided in the form of an 8-bit word.

The measurement timer and oscillator control module 330 may provide an oscillator enable signal to the temperature sensor and sampler module 310 to enable the internal oscillator therein. The measurement time and oscillator control module 330 may also keep a timer which controls the rate at which temperature measurements may be sampled, and can provide this information to the control block using a Timer Expired signal. The measurement timer and oscillator control module may further receive temperature thresholds (Tsens thresholds) and generate an interrupt signal to an external controller to shut down a portion of an integrated circuit whose temperature is outside the limits of the received thresholds. For example, a portion of the semiconductor die (hereinafter "die") may be shut down if it exceeds a temperature threshold in order to prevent it from causing damage to the integrated circuit due to overheating.

By controlling the multiprobe temperature measurement device 300 using the components listed above in the digital core 315, the device 300 may operate in an autonomous manner, and not rely upon (or minimally use) an external processors which controls other functionality within the mobile device. Finally, the temperature measurement module 305 may serve as a "wrapper" for the device 300, and may provide both an analog functionality and/or an interface to other subsystems within the mobile device.

The multiprobe temperature measurement device 300 may integrated in at least one semiconductor die. Additionally, the multiprobe temperature measurement device 300 may be integrated into a set top box, music player, video player, entertainment unit, navigation device, communications device, personal digital assistant (PDA), fixed location data unit, and/or a computer.

Figure 4:
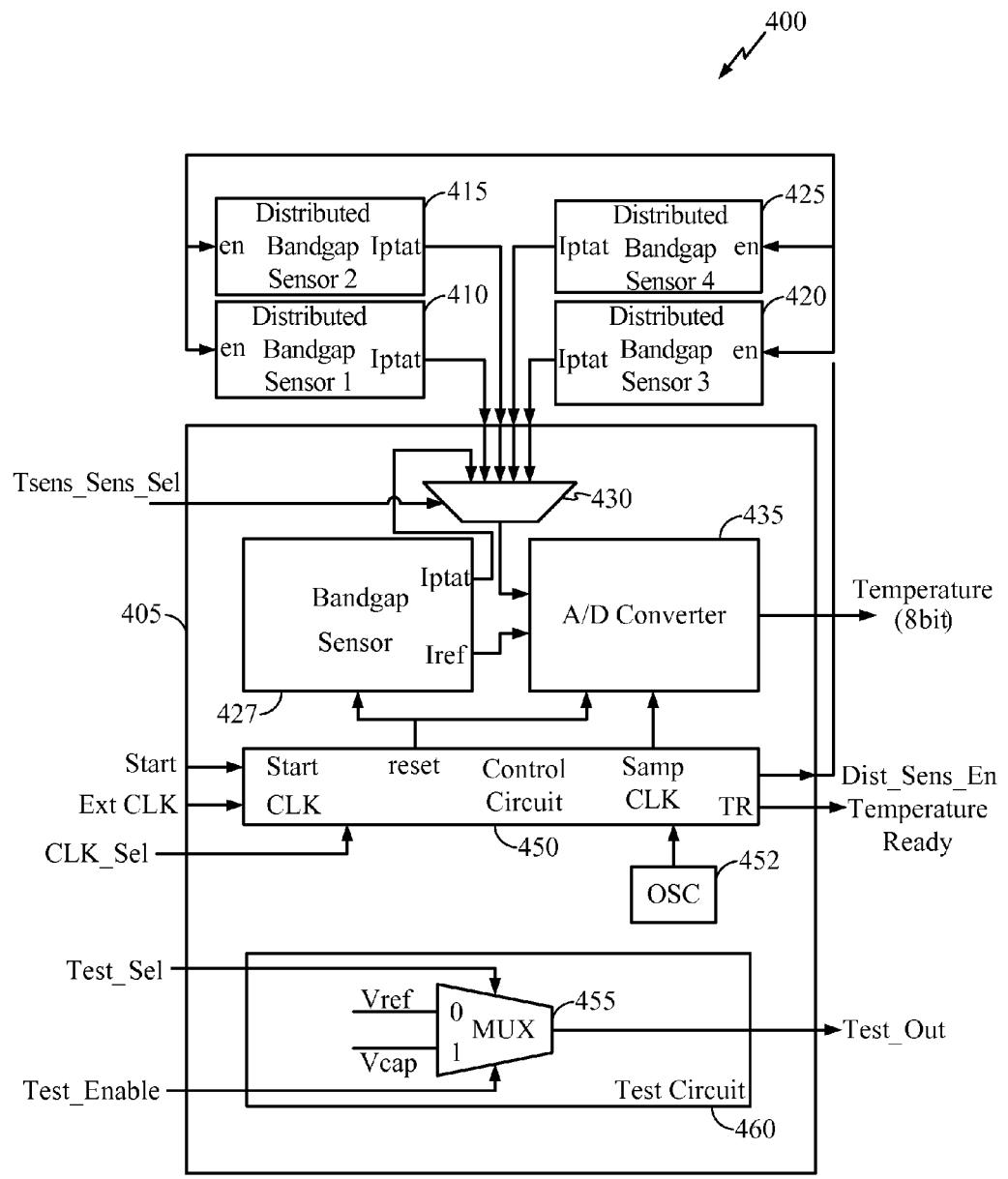
FIG. 4 is a block diagram illustrating details of an exemplary temperature sensor and sampler module for use within the multiprobe measurement device.

FIG. 4 is a block diagram illustrating details of an exemplary temperature sensor and sampler module (TSSM) 400 for use within the multiprobe measurement device 300. The TSSM 400 may include a plurality of bandgap temperature sensors 410-427. A subset of the plurality may be remotely position on other portions of the integrated circuit, and may be on a same die as the TSSM 400, and/or another die in an integrated circuit having a multi-die arrangement that can be housed within a single IC package. At least one temperature sensor 427 may reside on the same die as the TSSM 400 itself. Each bandgap temperature sensor may provide the Iptat current to a multiplexor 430, which can be used to select a current for subsequent digitization by the analog to digital (A/D) converter 435. The multiplexor may receive a Tsens_Sensor_Sel signal from the datapath module 325 to perform the selection. The A/D converter 435 may digitize and appropriately scale the input current signal Iptat to provide temperature data words (e.g., 8-bit words). A digital control circuit 450 may be used to select the clock signal (external or internal) which may be used as a sampling clock for the A/D converter 435. An internal clock signal may be provided by an oscillator 452, which may be a free-running ring oscillator. Alternatively, an external clock signal (Ext CLK) may be used for the A/D sampling clock. If an external clock signal is used, the internal oscillator 452 may be disabled to save power. The selection of which clock to use may be performed by a CLK_Sel signal provide by the control block 320. An on-board test circuit block 460 may be included in the TSSM 400, which may select various test signals using multiplexer 455. Multiplexor 455 may be controlled by control block 320 using a Test_Sel signal to select a test, and a Test_Enable signal to activate the test circuit 460. Test outputs may be provided from the test circuit 460 back to the control block 320.

Figure 5:
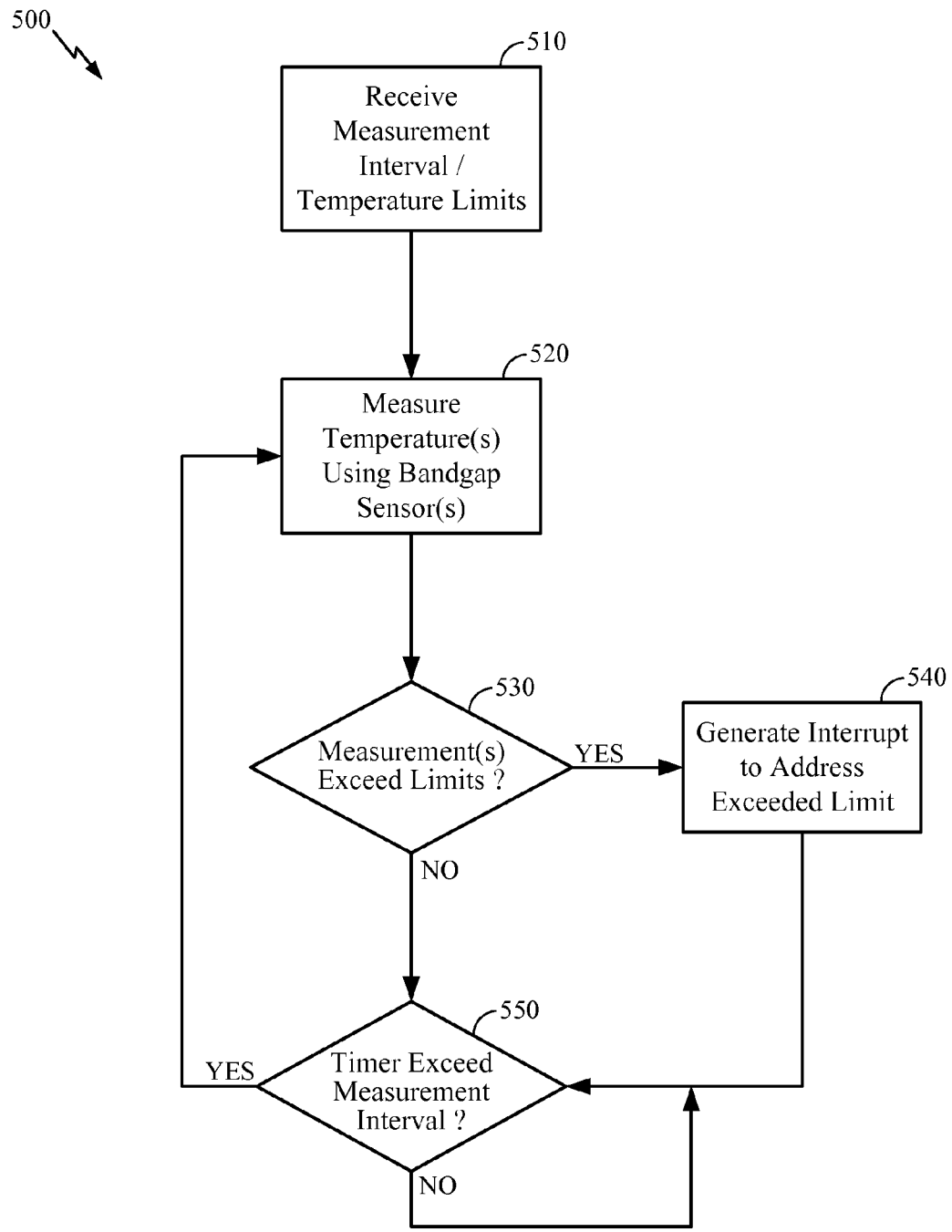
FIG. 5 is a flowchart illustrating an exemplary process associated with an embodiment of the multiprobe measurement device.

FIG. 5 is a flowchart illustrating an exemplary process 500 associated with an embodiment of the multiprobe measurement device 300. This process may be executed entirely or in-part on the controller 320, and may permit autonomous operation (e.g., operate with minimal or no interaction with the processor controlling the mobile device). Process 500 may begin by initializing values for a temperature measurement interval and temperature limits (510). These values may be received from a controller within the mobile device during initialization of the mobile device (e.g., boot-up). Alternatively, these values may be preprogrammed and stored within the multiprobe measurement device 300. The temperature measurement interval may be a period of time between successive temperature measurements associated with one or more designated temperature sensor(s) (e.g., 410, 415, 420, 425, 427). The temperature limit values may represent maximum and/or minimum operating temperatures thresholds for one or more areas on the die and/or other off-die portions of the mobile device. Temperature values may be measured by one or more bandgap temperature sensors which may be provided as a digital value (e.g., 8-bit word) (520). A particular temperature sensor may be selected using a multiplexor 430 based upon a sensor select signal (Temp_Sens_Sel). In some embodiments, a plurality of measurement values may be provided at the measurement interval so the temperature gradients across the die may be determined.

Once the desired temperature measurement is obtained, controller 320 may perform a test to determine if the temperature exceeds a temperature limit (530). If so, an interrupt may be generated to address the exceeded limit. The interrupt may be provided to the mobile device's controller, and/or to another control circuit, to take some form of action (e.g., shut down portions of an overheating section of the die, reduce voltages and/or clock rates, etc.). If in conditional block 530 it is determined that no temperature limits are exceeded, the process may the determine when to take the next temperature measurement. This may be performed by conditional block 550 checking to see whether the measurement interval has been exceeded by checking a timer value which may be generated by internal timer 330 (550). If the timer value has exceed the measurement interval, the process may loop back to block 520 to perform another measurement. If the measurement interval has not been exceeded, the process may loop upon block 550 to continue checking until the timer exceeds the measurement time interval. One should appreciate that process 500 may be implemented by any processor (CPU), controller, ASIC, FPGA, DSP, special purpose hardware, etc.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the foregoing disclosure shows illustrative embodiments, it should be noted that various changes and modifications could be made herein without departing from the scope of the invention as defined by the appended claims. The functions, steps and/or actions of the method claims in accordance with the embodiments described herein need not be performed in any particular order. Furthermore, although elements may be described or claimed in the singular, the plural is contemplated unless limitation to the singular is explicitly stated.

What is claimed is:

1. A device for providing temperature measurements within a package housing at least one integrated circuit, comprising:
   a plurality of bandgap sensors which provide currents proportional to their surrounding temperature;
   a multiplexer coupled to each bandgap sensor which accepts a control signal for selecting a current to sample;
   a analog-to-digital converter coupled to the multiplexer which digitizes the selected current;
   an oscillator which provides a sampling clock signal to the analog-to-digital converter; and
   a measurement timer and oscillator control module which provides an interrupt signal based on predetermined temperature thresholds associated with the plurality of bandgap sensors; and
   an external controller configured to shut down a portion of the integrated circuit based on the interrupt signal.

2. The device of claim 1, further comprising:
   a controller which determines the state of the analog-to-digital converter;
   a datapath module which provides the control signal to the multiplexor; and
   wherein the measurement timer and oscillator control module is further configured to provide a signal to the controller to determine when to measure temperature.

3. The device of claim 2, wherein the measurement timer and oscillator control module provides a signal to enable the oscillator.

4. The device of claim 1, wherein the plurality of bandgap sensors are distributed to different areas within the package.

5. The device of claim 4, wherein the different areas correspond to areas associated with integrated circuits on different dies, and further correspond to differing functional units.

6. The device of claim 5, wherein the differing functional units correspond to a micro-processor unit, a memory, a digital signal processor, and/or a field programmable gate array.

7. The device of claim 4, wherein temperature gradients between the different areas are determined based upon the measurements performed by at least two bandgap sensors.

8. The device of claim 1, wherein at least one of the plurality of bandgap sensors operates below 1.5 volts.

9. The device of claim 1, wherein at least one of the plurality of bandgap sensors further comprises:
   a first transistor having an emitter node coupled in series to a first resistor and a first current source, wherein a PTAT (proportional to absolute temperature) current flows through the first resistor;
   a second transistor having a base node coupled to a base node of the first transistor, and a collector node coupled to a collector node of the first transistor, further wherein the first and second transistors are diode connected;
   a first operational amplifier providing negative feedback to the first current source, wherein the negative feedback is related to a difference in the base-emitter voltages of the first and second transistors; and
   a second operational amplifier which couples the base-emitter voltage of the second transistor across a second resistor, wherein a CTAT (complementary to absolute temperature) current flows through the second resistor.

10. The device of claim 9, wherein the at least one of the plurality of bandgap sensors further comprises:
    a second current source which is controlled by the second operational amplifier; and
    a third resistor having a reference current flowing there through, wherein the reference current is temperature invariant.

11. The device of claim 10, wherein a negative input of the first operational amplifier is coupled to a node of the first resistor having a higher voltage, and the positive input of the first operational amplifier is coupled to an emitter of the second transistor.

12. The device of claim 1 integrated in at least one semiconductor die.

13. The device of claim 1, further comprising a device, selected from the group consisting of a set top box, music player, video player, entertainment unit, navigation device, communications device, personal digital assistant (PDA), fixed location data unit, and a computer, into which the bandgap sensor is integrated.

* * * * *